United States Patent
Neumann et al.

(10) Patent No.: US 7,776,150 B2
(45) Date of Patent: Aug. 17, 2010

(54) PROCESS AND APPARATUS FOR HANDLING SYNTHETIC GYPSUM

(75) Inventors: Eberhard W. Neumann, Huntersville, NC (US); Claus Bech, North Charleston, SC (US)

(73) Assignees: Koppern Eqipment, Inc., Charlotte, NC (US); Giant Cement Company, Summerville, SC (US)

( * ) Notice: Subject to any disclaimer, the term of this patent is extended or adjusted under 35 U.S.C. 154(b) by 610 days.

(21) Appl. No.: 11/710,849

(22) Filed: Feb. 26, 2007

(65) Prior Publication Data

US 2007/0216068 A1  Sep. 20, 2007

Related U.S. Application Data

(60) Provisional application No. 60/783,005, filed on Mar. 16, 2006.

(51) Int. Cl.
*C04B 11/02* (2006.01)
*C04B 11/28* (2006.01)
*B28B 3/00* (2006.01)

(52) U.S. Cl. .................. 106/772; 106/638; 106/697; 106/775; 106/776; 106/785; 264/333; 425/421; 425/456

(58) Field of Classification Search .................. 106/638, 106/697, 772, 775, 776, 785; 264/333; 425/421, 425/456

See application file for complete search history.

(56) References Cited

U.S. PATENT DOCUMENTS

| | | | |
|---|---|---|---|
| 2,412,170 A | 12/1946 | Peter | |
| 4,028,126 A | 6/1977 | Mori et al. | |
| 4,042,408 A | 8/1977 | Murray et al. | |
| 4,173,610 A | 11/1979 | Huller et al. | |
| 4,239,716 A | 12/1980 | Ishida et al. | |
| 4,377,414 A | 3/1983 | Buschmann et al. | |
| 5,015,450 A | 5/1991 | Koslowski | |
| 5,100,464 A | 3/1992 | Kelly et al. | |
| 5,173,284 A | 12/1992 | Moisset | |
| 5,203,512 A | 4/1993 | Ferraris et al. | |
| 5,350,549 A | 9/1994 | Boyle | |
| 5,362,471 A | 11/1994 | Roth et al. | |
| 5,562,892 A | 10/1996 | Kirk et al. | |
| 6,083,465 A | 7/2000 | Piasecki et al. | |
| 6,098,851 A | 8/2000 | Anderson | |
| 6,213,415 B1 | 4/2001 | Cheung | |
| 6,270,564 B1 | 8/2001 | Hukkanen | |
| 6,391,958 B1 | 5/2002 | Luongo | |
| 6,471,767 B1 | 10/2002 | Konczak | |
| 6,666,154 B2 | 12/2003 | Logan et al. | |
| 6,730,162 B1 | 5/2004 | Li et al. | |
| 6,752,848 B2 | 6/2004 | Logan et al. | |
| 6,752,865 B2 | 6/2004 | Nayak et al. | |
| 6,846,131 B2 | 1/2005 | Ianniello et al. | |
| 6,860,680 B2 | 3/2005 | Inniello et al. | |
| 6,869,474 B2 | 3/2005 | Perez-Pena et al. | |
| 2005/0188898 A1* | 9/2005 | Bruce et al. | 106/783 |

\* cited by examiner

*Primary Examiner*—Elizabeth D Wood
(74) *Attorney, Agent, or Firm*—McNair Law Firm, P.A.; William D. Lee, Jr.

(57) ABSTRACT

Method and apparatus for converting wet synthetic gypsum from a flue desulphurization process (FGD) to easily handled and metered briquettes by mixing a hydraulic additive such as by-pass dust from a cement kiln with synthetic gypsum and allowing the heat from the resulting hydraulic reaction to reduce the water content of the mixture to a formable consistency without adding external heat to the mixture as it is formed into briquettes.

8 Claims, 1 Drawing Sheet

PROCESS AND APPARATUS FOR HANDLING SYNTHETIC GYPSUM

CLAIM OF PRIORITY

Priority is claimed from U.S. Provisional Application Ser. No. 60/783,005 filed Mar. 16, 2006 having the same title.

FIELD OF THE INVENTION

This invention relates to a process and apparatus for handling synthetic gypsum so that it may be more effectively handled, stored, and metered in cement production and similar processes.

BACKGROUND OF THE INVENTION

In the cement industries it is known to use $CaSO_4$ from gypsum to control the setting properties of cement paste. Synthetic gypsum from flue gas desulphurization (FGD) has become a prime source of gypsum as central power producing stations that burn coal have been converted to the use of the desulphurization process. As a result synthetic gypsum is a major sulphate donor for control of the setting properties of cement. The synthetic gypsum available from FGD processes usually has a sludge-like consistency that is very sticky and quite difficult to handle with accurate predictability. One problem that the difficult handling causes is the control of the quantity of pure synthetic gypsum in a cement mix so that fluctuations in the cement clinker/sulphate ratio do not occur and adversely affect the quality of the cement. Accordingly, one general object of the present invention is to transform the synthetic gypsum into a form which makes its handling easy and its metering reliable.

In a patent entitled "Process for the Manufacture of Lump Calcium Sulfate" which issued on Nov. 6, 1979 to Huller, et al. as U.S. Pat. No. 4,173,610, a process for the manufacture of calcium sulfate pellets from finely divided, natural or synthetic calcium sulfate is described where the free water content of the calcium sulfate is about 0.5 to about 4 percent and then the finely divided calcium sulfate is pressed in a roller press between 0° and 60° C. However, it is an object of the present invention to provide synthetic calcium sulphate by a simplified process that does not require the step of making finely divided pellets or the drying of calcium sulfate by external heating or drying means.

In another patent entitled "Process for Producing Gypsum Flake from Flue Gas Desulfurization" which issued on Nov. 8, 1994 to Roth, et al. and was given U.S. Pat. No. 5,362,471, flakes or chips of gypsum are formed from powdered gypsum whose moisture content is adjusted and then the gypsum is compacted and rolled into a sheet. Accordingly, it is another object of the present invention to avoid the use of powdered gypsum and the addition of moisture to produce gypsum flake.

In U.S. Pat. No. 6,471,767 B1 which issued on Oct. 29, 2002 to Konczak, wet synthetic gypsum waste is dewatered by passing it through an extruder and draining the water from it. The dewatering is aided by applying a vacuum to the extruder. This process produces synthetic gypsum rock and requires complicated extrusion and vacuuming processes that have high energy consumption.

Accordingly, it is another object of the present invention to provide a process for making synthetic gypsum in solid form which does not require the use of an extruder or vacuum and has relatively low energy consumption.

The foregoing and other objects are achieved by the present invention as will be better understood by reference to the following summary of the invention, drawings, and detailed description.

SUMMARY OF THE INVENTION

In one aspect, the present invention is a method for forming solid objects from wet synthetic gypsum by adding an agent to the gypsum to produce a hydraulic exothermic reaction; allowing the hydraulic reaction to take place, and the heat from the reaction to dry the gypsum to a formable consistency, and then forming the gypsum in a solid shape, the water consumption from the hydraulic reaction and the heat from the reaction being the means used to dry the gypsum to a formable consistency. That is, while the active agent may be at an elevated temperature when added to the gypsum, the mix of gypsum and agent is not heated.

In another aspect, the present invention is an improved process for preparing and handling synthetic gypsum for use in a cement production or other processes comprising the steps of: providing synthetic gypsum in a form having a paste-like consistency; adding a hydraulic active additive to said gypsum to initiate a reaction with the water in said gypsum; reducing the surface water content of said gypsum by allowing said reaction to continue to thereby heat said gypsum until the surface water content has been reduced to a predetermined value or a level at which compacting may be successfully achieved; and then compacting said gypsum into sheets or briquettes; and, storing said compacted gypsum until it is ready for use in cement production or other processes.

In a further aspect, the hydraulic active additive is by-pass dust or circulated kiln dust from a rotary cement clinker kiln. In a still further aspect, the hydraulic active agent may be cement or may be quick lime, calcium oxide CaO.

A feature of the invention is that the mixture of synthetic gypsum and hydraulic active additive may be held for a retention period or time to allow the surface water to sufficiently evaporate due to the heat of the hydraulic reaction, there being no externally added heat to the process. The mixture of synthetic gypsum and hydraulic active additive may be held in a mixture inside or outside of a mixer such as a pug mill. The retention time is preferably greater than about 5 minutes and preferably between 5 and 20 minutes.

Yet another aspect of the method according to the present invention includes compacting the mixture of synthetic gypsum and hydraulic active additive with roller presses or in a briquetting machine. Pressing forces in the briquetting machine or compactor are preferably in excess of 20 kN/cm, preferably between 35 and 75 kN/cm.

The invention also includes the equipment or machinery arranged in a system to carry out the foregoing methods of the invention.

DESCRIPTION OF THE DRAWINGS

Attached hereto and made a part of this disclosure is the following drawing which is presented by way of illustration and not of limitation.

DETAILED DESCRIPTION

Figure 1:
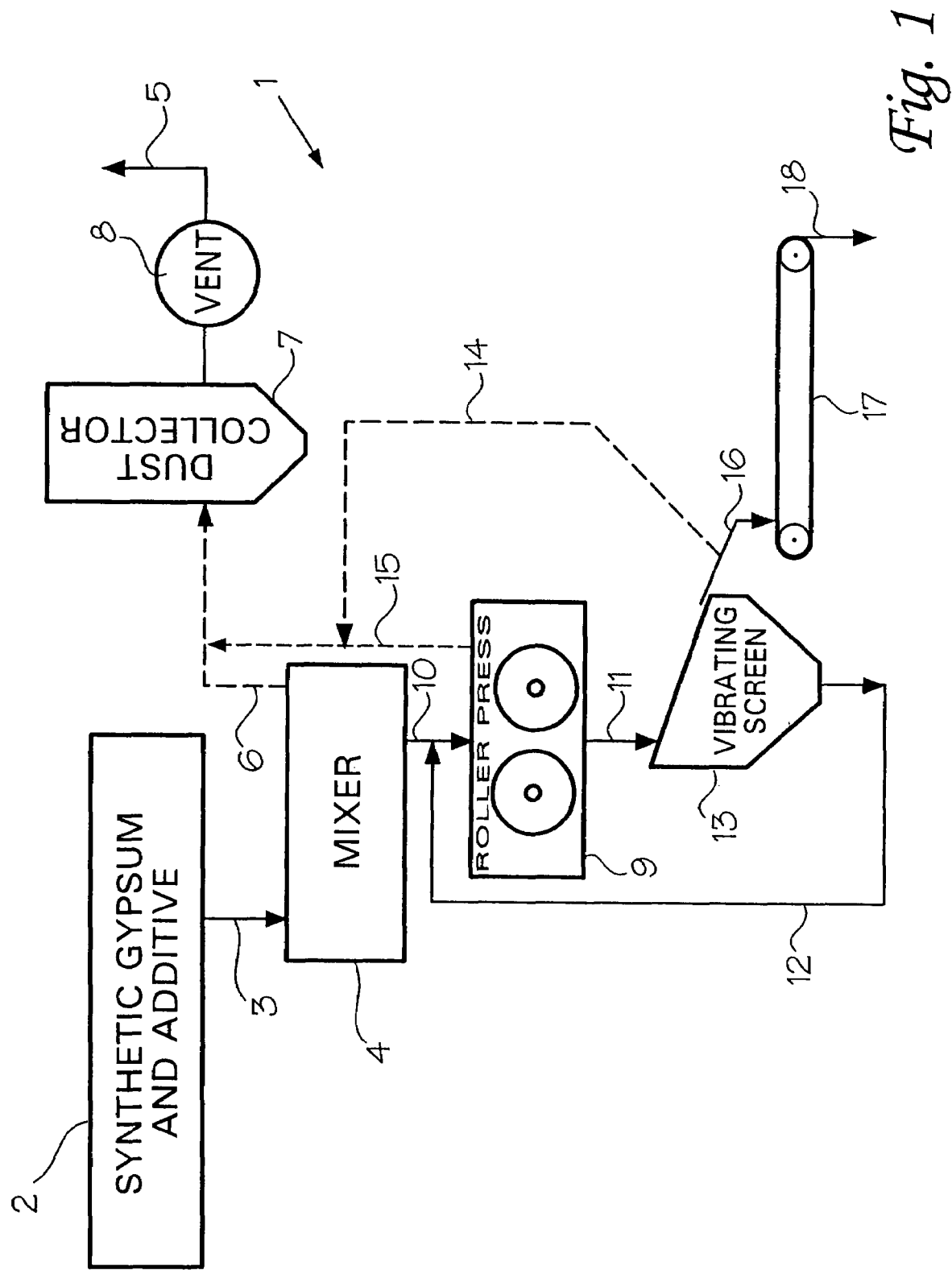
FIG. 1 is a schematic representation of the method according to the present invention showing the arrangement of equipment and the flow of material.

Referring now to FIG. 1, a schematic layout of the system 1 which will perform the method of the present invention is shown. The process begins at numeral 2 where synthetic gypsum and a hydraulic active additive are fed through line 3 to mixer 4. The hydraulic reaction which is exothermic begins as the gypsum and addition contact each other and continues in the mixer as the components are mixed. It can be advantageous to feed the additive at an elevated temperature to accelerate the reaction. The synthetic gypsum is preferably provided from a central station desulphurization process (FGD) and the hydraulic additive is preferably kiln by-pass dust from a cement clinker rotary kiln. The synthetic gypsum from the FGD process is provided in a wet pasty condition. The hydraulic reaction increases the temperature of the mix so that the heat reduces the surface water concentration of the mix to a value that allows for stable briquette or slab formation. The mixture may be a pug mill or paddle mill or similar device.

During mixing the material will reach a temperature of about 190° F. due to the exothermic hydraulic reaction. At this temperature, water will evaporate from the mix so that venting must be provided for the mixture.

If an additive with a lower hydraulic reactivity is used in the mix, the mix may have to be kept on a slow moving conveyer belt or similar transfer device to increase retention time for the hydraulic reaction and resulting water evaporation to take place prior to the mix entering the next step where the mix is fed on to conveyor represented by line 10 to the compacting roller mill 9 when the moisture content has reached a formable consistency level, such consistency being readily identifiable by those skilled and experienced in the art. The roller press 9 supplies pressure to the mix between two counter rotating rolls that is sufficiently high to form stable briquettes or flakes. Preferably the pressing force is in excess of 20 kN/cm and more preferably between 35 and 75 kN/cm.

Line 6 from mixer 4 and line 15 from the roller press 9 which are shown in dotted lines feed dust created in the respective components to dust collector 7 which allows moisture to be discharged through the atmosphere through vent 8 and out through vent line 5.

The compacted mix is next moved from the mixer line by conveyor represented by line 11 to vibrating screen 13. Experience has shown that not all material will be compacted or briquetted in the compactor 9 and the vibrating screen 13 is used to separate the untreated or unattached fines from the compacted material. The fines are recirculated to the roller press through line 12.

The compacted material leaving the screen 13 is deposited on conveyor belt 17 as indicated by arrow 16. The finished briquettes represented by arrow 18 may now be stored and then withdrawn from storage for subsequent use such as cement making. As previously mentioned, the use of pure synthetic gypsum in its paste or other form presents a difficult handling and dosage control problem with the result that the quantity of calcium sulfate is not consistent. In the present process, the synthetic gypsum is converted to a solid phase where it is readily available in known quantities by weight for mixing with cement clinkers which are provided to make a consistent finished cement product. The process does not require the use of an extruder for dewatering and densifying but rather uses the reaction of hydraulic additives which may be the by-pass dust or circulated dust from a rotary cement clinker kiln, cement, quick lime, dolomitic quick lime, or a mixture of any of the foregoing.

In a best mode of the invention, synthetic gypsum paste from a desulphurization process (FGD) is mixed with bypass dust from a rotary cement clinker kiln at a temperature between 250° to 400° F. This mix is fed into a pug mill and mixed and held to allow surface water to evaporate due to the hydraulic reaction between the gypsum and the kiln dust. The retention time is between 5 and 20 minutes and when the surface water has sufficiently evaporated and reached a formable consistency; the mixture is conveyed to a roller press compactor and subjected to a compacting force between 35 and 75 kN/cm to produce briquettes. Once compacted, the briquettes are removed and taken to storage. They are now ready to be used in a cement production process. The preferred equipment that forms the system as laid out in FIG. 1 comprises a pug mill mixer, which is well-known to those skilled in the art, a roller press, which produces briquettes or sheets which is also well-known as is also the vibrating screen. The layout of the equipment as shown in FIG. 1 presents the best mode of the system.

While preferred embodiments of the invention have been shown and described above, after reading and studying the above it may occur to some of those skilled in the art that changes and modifications may be made therein without departing from the spirit of the invention, the scope of which is defined and limited only by the attached claims.

What is claimed is:

1. A process for preparing and handling synthetic gypsum for cement production and like uses comprising the steps of:
   a) providing synthetic gypsum in a form consisting essentially of gypsum having a paste-like consistency;
   b) adding sufficient hydraulic active additive to said gypsum to initiate a hydraulic exothermic reaction to evaporate water in said gypsum;
   c) allowing said reaction to continue until the surface water on the mixture has been reduced to a level at which the mixture is formable;
   d) compacting said gypsum when the water content has been sufficiently reduced to allow stable compaction of said gypsum; and
   e) storing said compacted gypsum for future use or using it in a cement making process immediately.

2. The process of claim 1 wherein the hydraulic active additive is by-pass dust from a rotary cement clinker kiln at a temperature in the range from about 250° F. to about 400° F.

3. The process of claim 1 wherein the mixture is held and allowed to react for a period of 5 to 20 minutes.

4. The process of claim 1 wherein the mixture is held within a mixer.

5. The process of claim 1 wherein the hydraulic active additive is selected from the group consisting of circulated kiln dust, quick lime, dolomitic lime, and cement.

6. The process of claim 1 wherein the compacting takes place in an applied pressing force from 35 to 75 kN/cm.

7. The process of claim 1 wherein the paste-like synthetic gypsum is the product of a flue gas desulphurization process.

8. A process for forming solid objects from wet, paste-like material that is predominantly gypsum comprising the steps of adding an agent to the gypsum to produce an exothermic reaction, allowing the heat from the reaction to dry the gypsum to a formable consistency without using any other means to dry the gypsum, and then forming the gypsum into a solid shape.

* * * * *